J. E. Wisner.
Horse Rake.

No. 108744. Patented Oct. 25, 1870.

Witnesses:
August Bastert

Inventor:
J. E. Wisner
By Farwell, Ellsworth & Co.
Attorneys.

UNITED STATES PATENT OFFICE.

JAMES E. WISNER, OF FRIENDSHIP, NEW YORK.

IMPROVEMENT IN HORSE HAY-RAKES.

Specification forming part of Letters Patent No. 108,744, dated October 25, 1870.

*To all whom it may concern:*

Be it known that I, JAMES E. WISNER, of Friendship, in the county of Allegany and State of New York, have invented certain new and useful Improvements in Horse Hay-Rakes; and I do hereby declare the following to be a full, clear, and exact description of the same, reference being had to the accompanying drawing, forming part of this specification, in which—

Figure 2:
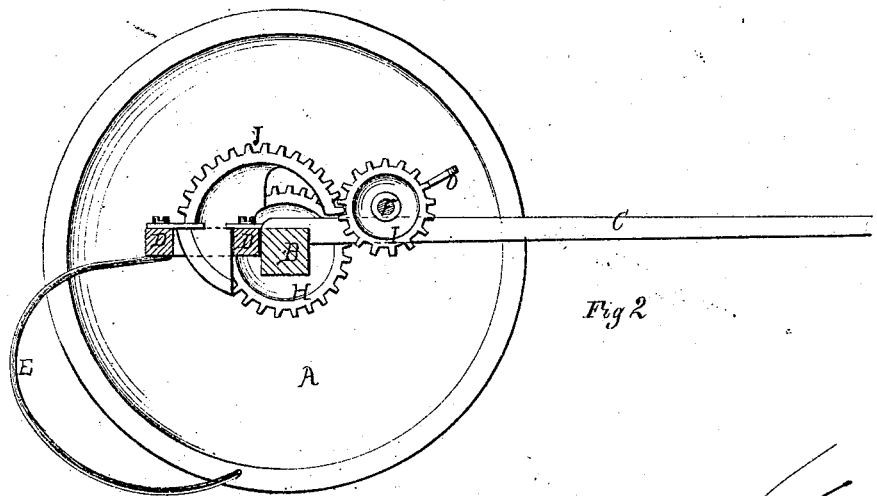
Figure 3:
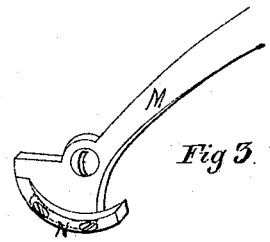
Figure 1:
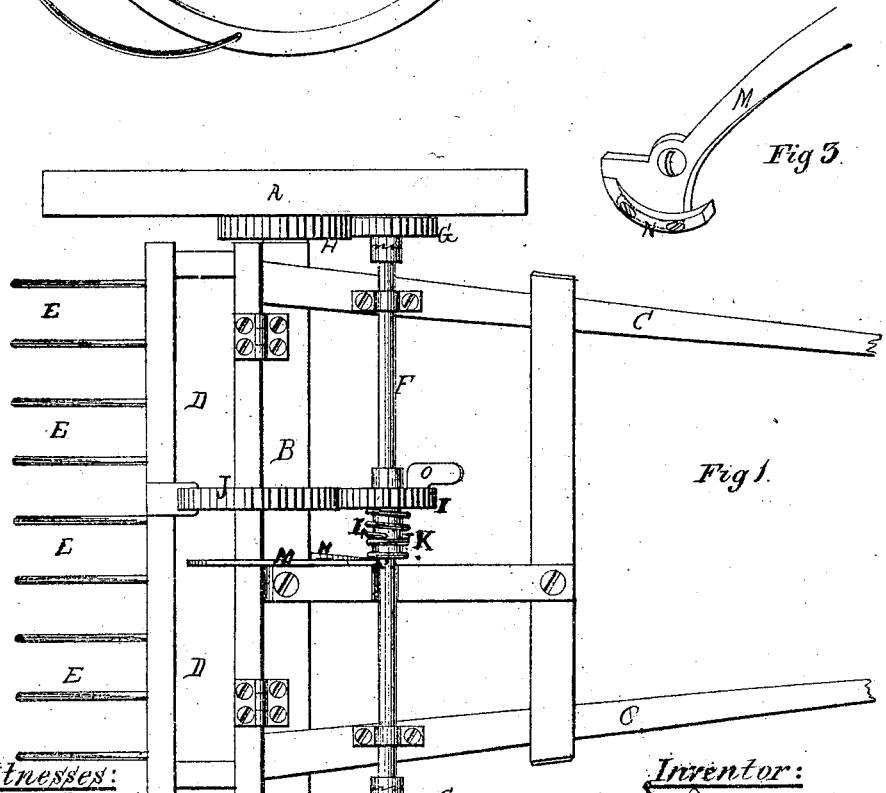

Figure 1 is a top-plan view of a horse hay-rake, showing my improvements applied thereto. Fig. 2 is a longitudinal section of the same in the plane of the line $x\,x$, Fig. 1; and Fig. 3 is a detached view of the operating-lever.

Similar letters of reference denote corresponding parts.

My invention has for its object to improve the means for automatically dumping horse hay-rakes; and to this end it consists in the combination, with the gear-wheel upon the rake-head and the clutch and pinion upon the operating-shaft, of a shipping-lever, adapted to be tripped by the rake-head to drop the teeth after the latter have been raised to dump the hay.

It consists, further, in the construction of a shipping-lever, and in the combination of various parts of the dumping mechanism, as will be hereinafter described.

In the accompanying drawing, A A are the wheels, B the axle, and C the shafts, of a horse hay-rake of the ordinary construction. D is the rake-head, provided with the teeth E, and hinged to the rear of the axle, as shown. F is a transverse shaft mounted in bearings upon the thills or frame of the rake in front of the axle, and provided at each end with pinions G, which engage with pinions H, affixed to the inner end of the hubs or face of the wheels around the hubs. I is another pinion mounted loosely upon the center of the shaft F, and adapted to engage with a segmental gear-wheel, J, securely attached to the rake-head. K is a sleeve, attached to the shaft F by a feather and groove, so that it shall rotate with the shaft and slide longitudinally upon the same. This sleeve, together with the hub of the pinion I, forms a clutch, the two parts being held disengaged by the tension of the spring L. Pivoted to the axle or frame of the rake, within reach of the foot or hand of the operator, is a lever, M, whose shorter arm is made segmental in form, and provided with an adjustable cam, N, which bears against the end of the sleeve K.

The operation is as follows: Whenever it is desired to dump the hay gathered by the rake into a windrow, the operator presses the outer end of the lever M downward with his foot or hand, preferably the former, and the cam N forces the sleeve to engage with the pinion I, so that the latter will rotate with the shaft, which, as previously mentioned, is driven by the wheels A. As the machine continues to be drawn forward the pinion I, engaging with the segmental wheel J, rotates the latter and raises the rake-head and teeth sufficiently to discharge the hay. The rake-head, at about the time the teeth have cleared the windrow, strikes the long arm of the lever M, raising the same and throwing the cam N out of contact with the sleeve, which, in its turn, is disengaged from the pinion I by the spring, permitting the pinion to again rotate upon the shaft F and the rake to drop back to its former position upon the ground and continue the operation of raking. If, however, it is found necessary, for any reason, to keep the rake-teeth elevated, the operator presses with his foot upon an arm, O, attached to the side of the pinion I, when such arm has been carried by the pinion, in the operation of raising the teeth, to that side of the shaft next the axle of the rake. By this means the continued pressure upon the arm O prevents the rotation of the pinion, and consequently holds the rake-teeth and head in an elevated position. If, however, it is desired to hold the teeth within the hay in order to gather an increased quantity, or in heavy hay, the operator presses upon the arm O when the same is upon the front side of the shaft F, and thus prevents the pinion I from rotating, and consequently the rake-head and teeth from lifting.

The cam N is made adjustable upon the lever by any suitable means. In this example of my invention this result is attained by the set-screws in the former passing through slots formed in the segmental end of the latter. The object of this adjustability is to change the position of the lever with relation to the rake-head so that it shall be tripped when the teeth have been raised a greater or lesser distance from the ground. This is of great importance, inasmuch as it is necessary to vary the elevation of the teeth in raking heavy and light hay, or in proportion to the size of the windrows being formed. To clear a large windrow, the teeth must be raised much higher than is necessary to pass over a smaller one.

To permit the backing of the rake without operating the gearing, the pinion G may be arranged in any convenient manner to rotate independently of the shaft F when the machine is backed.

I do not confine myself to the precise construction of the rake-head shown, as my improvements are applicable to any rising and falling head.

Having thus described my invention, what I claim as new, and desire to secure by Letters Patent, is—

1. In combination with the segmental gear-wheel and the clutch-sleeve and pinion, a shipping-lever operated from the rake-head, substantially as described, for the purpose specified.

2. The clutch-operating lever M, constructed with an adjustable cam, substantially as described, for the purpose specified.

3. In combination with the rake-head, the shaft F, operated by gearing from the wheels of the rake, the segmental gear-wheel J, the clutch-sleeve and pinion, and shipping-lever, substantially as described, for the purpose specified.

JAS. E. WISNER.

Witnesses:
E. A. ELLSWORTH,
N. K. ELLSWORTH.